(12) United States Patent
Fujiwara

(10) Patent No.: US 10,281,361 B2
(45) Date of Patent: May 7, 2019

(54) TIRE UNIFORMITY TESTER AND TIRE UNIFORMITY MEASUREMENT METHOD

(71) Applicant: Kobe Steel, Ltd., Hyogo (JP)

(72) Inventor: Hideto Fujiwara, Takasago (JP)

(73) Assignee: Kobe Steel, Ltd., Hyogo (JP)

( * ) Notice: Subject to any disclaimer, the term of this patent is extended or adjusted under 35 U.S.C. 154(b) by 122 days.

(21) Appl. No.: 15/504,366

(22) PCT Filed: Jul. 23, 2015

(86) PCT No.: PCT/JP2015/070897
§ 371 (c)(1),
(2) Date: Feb. 16, 2017

(87) PCT Pub. No.: WO2016/031443
PCT Pub. Date: Mar. 3, 2016

(65) Prior Publication Data
US 2017/0234774 A1    Aug. 17, 2017

(30) Foreign Application Priority Data
Aug. 27, 2014  (JP) ................................ 2014-172694

(51) Int. Cl.
*G01M 17/02* (2006.01)
*B60C 25/00* (2006.01)

(52) U.S. Cl.
CPC ......... *G01M 17/022* (2013.01); *B60C 25/007* (2013.01); *G01M 17/021* (2013.01)

(58) Field of Classification Search
None
See application file for complete search history.

(56) References Cited

U.S. PATENT DOCUMENTS

| 7,434,454 B2* | 10/2008 | Matsumoto ......... G01M 17/022 |
| | | 451/1 |
| 2003/0196483 A1* | 10/2003 | Beebe ................. G01M 17/022 |
| | | 73/146 |

(Continued)

FOREIGN PATENT DOCUMENTS

| CN | 1646891 A | 7/2005 |
| CN | 103842792 A | 6/2014 |
| JP | H02-223843 A | 9/1990 |

OTHER PUBLICATIONS

International Search Report issued in PCT/JP2015/070897; dated Oct. 13, 2015.

(Continued)

*Primary Examiner* — Andre J Allen
(74) *Attorney, Agent, or Firm* — Studebaker & Brackett PC

(57) ABSTRACT

A tire uniformity tester having: a spindle capable of rotating while holding a tire; a drum; a pressing mechanism that rotatably supports the drum and makes it possible to press a tire attached to the spindle into the drum through the relative movement of the drum and spindle; a uniformity measurement unit for measuring the uniformity of the tire during forward rotation and reverse rotation; and a control device. The control device controls the driving of the rotation of the spindle and the relative positions of the spindle and drum so that when the rotation direction of the spindle is reversed, the spindle and drum are separated from each other such that the spindle rotation speed reaches zero in a state in which the outer peripheral surface of the drum and the tire tread surface are not in contact with each other.

6 Claims, 4 Drawing Sheets

(56) References Cited

U.S. PATENT DOCUMENTS

| | | | | |
|---|---|---|---|---|
| 2006/0272408 A1* | 12/2006 | Matsumoto | ......... | G01M 17/022 |
| | | | | 73/462 |
| 2011/0226050 A1* | 9/2011 | Nakayama | .......... | G01M 17/021 |
| | | | | 73/146 |
| 2014/0230535 A1* | 8/2014 | Okada | ................... | G01M 17/02 |
| | | | | 73/146 |
| 2015/0027215 A1* | 1/2015 | Wakazono | ............ | G01M 17/02 |
| | | | | 73/146 |
| 2017/0153163 A1* | 6/2017 | Okada | ................. | G01M 17/022 |

OTHER PUBLICATIONS

Written Opinion issued in PCT/JP2015/070897; dated Oct. 13, 2015.

* cited by examiner

TIRE UNIFORMITY TESTER AND TIRE UNIFORMITY MEASUREMENT METHOD

TECHNICAL FIELD

The present invention relates to a test technology for tire uniformity, and more particularly to a test technology for the tire uniformity capable of increasing measurement precisions of a variation in a force in the lateral direction (LFV: Lateral Force Variation) and conicity of the tire.

BACKGROUND ART

Hitherto, a tire test (uniformity test) has been carried out for measuring the uniformity of the tire, thereby determining whether the tire finished as a final product is good or bad. For example, the measurement of the uniformity of the tire of a passenger car is carried out by using a tire uniformity testing machine (hereinafter also simply referred to as tire testing machine) including a spindle shaft that rotates while holding a tire, a load drum (hereinafter also simply referred to as "drum") that includes an outer peripheral surface, a pressing mechanism that supports the drum for rotation, and moves the drum and the spindle shaft relatively to each other so as to press the tire mounted on the spindle shaft against the outer peripheral surface of the drum, and a pneumatic circuit that adjusts the pressure of compressed air supplied from a factory air source, and supplies the adjusted air to the tire seated on rims in accordance with the following steps.

First, the rims separated into upper and lower rims sandwich the tire that has been transported from an upstream of an inspection line. Then, the pneumatic circuit inflates the tire for a short period, thereby fixing the tire to the rims, and then maintains an internal pressure of the tire at a test pressure. The pressing mechanism presses the outer peripheral surface of the drum to the tire having the internal pressure maintained at the test pressure as described before, and forward rotates the tire. The uniformity of the tire during the forward rotation is measured first. Then, the spindle shaft passes through a temporary stop state, and backward rotates the tire, and the uniformity of the tire is also measured during the backward rotation.

When the rotation of the tire stops in the state where a certain pressure is applied to the tire, in other words, in a state where the load drum and the tire are in contact with each other, a recess of the tire generated by the pressure of the load drum later becomes a residual recess in this measurement method of the tire uniformity. It takes a time for the residual recess to be restored to an original state, and when the uniformity is measured while the residual recess remains, the residual recess may largely affect precision of the measurement.

As a solution to this problem, for example, a technology disclosed in Patent Document 1 is mentioned. Patent Document 1 proposes a highly precise measurement of the tire uniformity without the deformation of a tire including pressing a load drum against a tread surface of the tire, then rotating the load drum in a predetermined direction, and, then, separating the tread surface of the tire from a contact surface (simulated road surface) of the load drum when the rotation of the load drum is to be inverted, thereby bringing the tire and the load drum in a non-contact state, in other words, in a separated state.

However, Patent Document 1 does not describe how to cause the operation of inverting the rotational direction of the tire and the operation of separating the tire and the load drum from each other to cooperate with each other when the tire uniformity is measured while the tire is backward rotating. Moreover, the measurement method for the tire uniformity disclosed in Patent Document 1 inverts the rotation of the load drum in a state where the tire and the load drum are not in contact with each other, and a power source such as a motor needs to be provided for the load drum for inverting the rotation, resulting in an increase in the cost of the device. If the load drum is inversely rotated by inverting the rotational direction of the tire, the rotational direction of the tire is inverted (backward rotation) while the load drum maintains the rotation in the same direction (forward rotation) by inertia, then, the tire and the load drum are again brought in contact with each other, and a "slip" may be generated between the rims for holding the tire and an inner diameter of the tire in contact with the rims, in other words, a "displacement" may be generated between the tire and the rims. If the uniformity during the backward rotation of the tire is measured while the displacement is generated between the tire and the rims, it is hard to measure the LFV and the conicity at a desired precision.

CITATION LIST

Patent Document

Patent Document 1: JP H2-223843A

SUMMARY OF THE INVENTION

It is an object of the present invention to provide a tire uniformity testing machine and a tire uniformity measurement method capable of precisely acquiring the tire uniformity, particularly the variation in the force in the lateral direction (LFV) and the conicity of the tire immediately after the tire forward rotation is switched to the backward rotation in the tire uniformity measurement.

The provided tire uniformity testing machine is a tire uniformity testing machine including a spindle shaft that is able to forward rotate and backward rotate together with a tire while holding the tire, a spindle shaft drive device that forward rotates and backward rotates the spindle shaft and the tire held thereby, a drum that has an outer peripheral surface that can be pressed against a tread surface of the tire, a pressing mechanism that supports the drum so as to rotate about a center axis of the outer peripheral surface, and moves the spindle shaft and the drum relatively to each other so as to be able to press the tread surface of the tire mounted on the spindle shaft against the outer peripheral surface of the drum, a uniformity measurement unit that measures uniformity of the tire during the forward rotation and the backward rotation based on a force generated on the drum while the tire is forward rotating and backward rotating, and a control unit that operates the spindle shaft drive device and the pressing mechanism so as to respectively control a rotational direction and a rotational speed of the spindle shaft and a relative position between the spindle shaft and the drum. The control unit controls rotational drive of the spindle shaft and the relative position between the spindle shaft and the drum such that when the rotational direction of the spindle shaft is inverted between the direction of the forward rotation and the direction of the backward rotation, the spindle shaft and the drum are relatively moved so as to be separated from each other, thereby causing the rotational speed of the spindle shaft to be 0 in a state where the outer peripheral surface of the drum and the tread surface of the tire are not in contact with each other.

The provided tire uniformity measurement method includes preparing a tire uniformity testing machine including a spindle shaft that is able to forward rotate and backward rotate together with a tire while holding the tire, a spindle shaft drive device that forward rotates and backward rotates the spindle shaft and the tire held thereby, a drum that has an outer peripheral surface that can be pressed against a tread surface of the tire, and a pressing mechanism that supports the drum so as to rotate about a center axis of the outer peripheral surface, and moves the spindle shaft and the drum relatively to each other so as to be able to press the tread surface of the tire mounted on the spindle shaft against the outer peripheral surface of the drum, measuring uniformity of the tire during the forward rotation and the backward rotation based on a force generated on the drum while the tire is forward rotating and backward rotating, and operating the spindle shaft drive device and the pressing mechanism, and carrying out rotational drive control, which is control of a rotational direction and a rotational speed of the spindle shaft, and relative position control, which is control of a relative position between the spindle shaft and the drum, where the rotational drive control and the relative position control comprise relatively moving the spindle shaft and the drum to separate from each other when the rotational direction of the spindle shaft is inverted, thereby causing the rotational speed of the spindle shaft to be 0 in a state where the outer peripheral surface of the drum and the tread surface of the tire are not in contact with each other.

DESCRIPTION OF EMBODIMENTS

Figure 1:
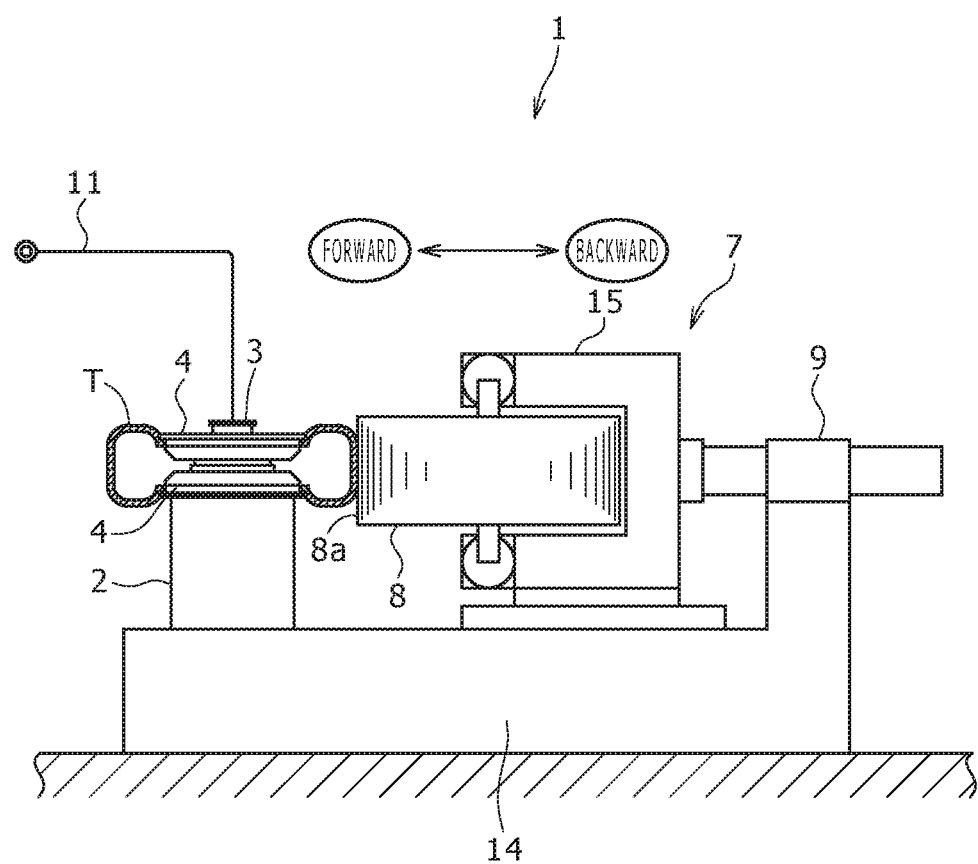
FIG. 1 is a front view with a partial cross section of a tire uniformity testing machine according to an embodiment of the present invention.
Figure 2:
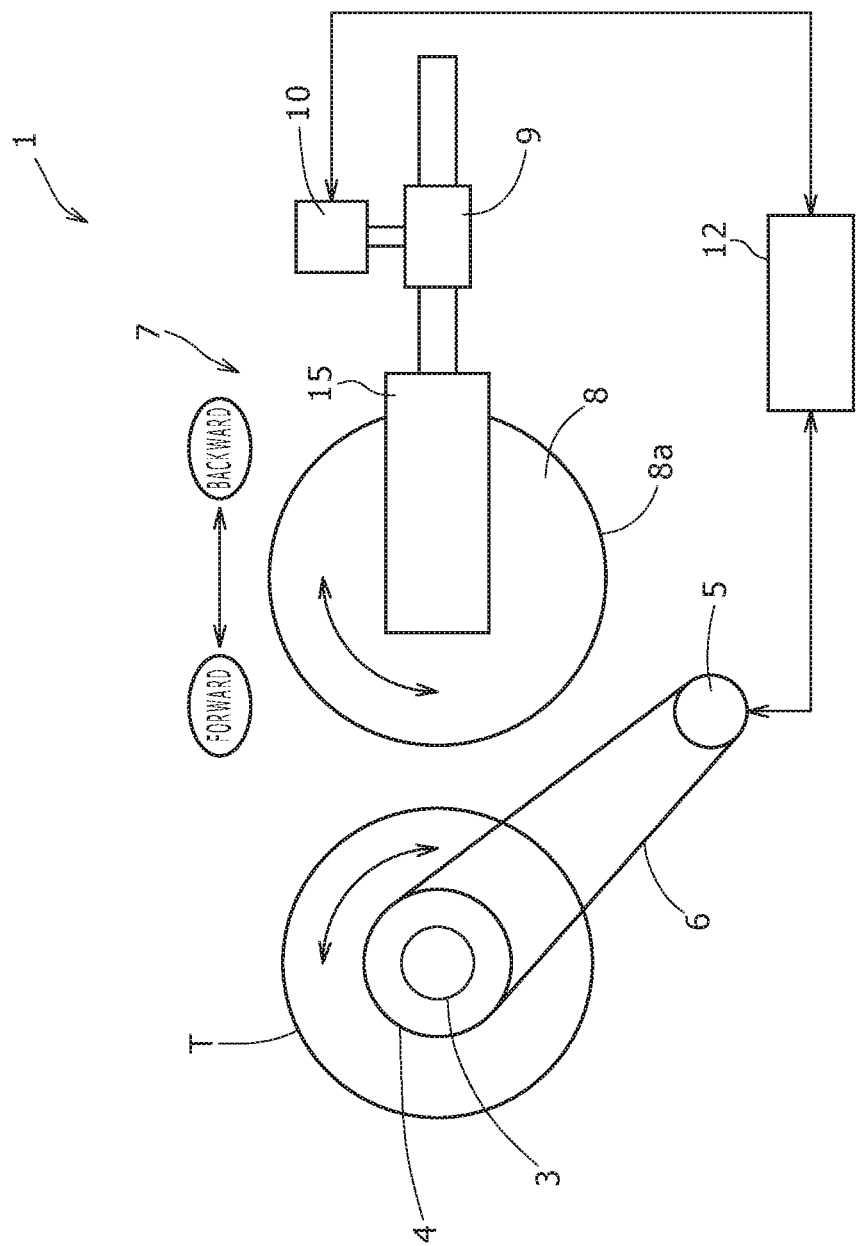
FIG. 2 is a plan view of the tire uniformity testing machine.

A description is given of the tire uniformity testing machine and the tire uniformity measurement method according to an embodiment of the present invention with reference to drawings. FIG. 1 and FIG. 2 show a tire uniformity testing machine 1 according to the embodiment, an "upward/downward direction" of the testing machine 1 corresponds to an upward/downward direction of the page of FIG. 1, and a "forward/backward direction" corresponds to a left/right direction of the page hereinafter.

The tire uniformity testing machine 1 (hereinafter also simply referred to as tire testing machine) is configured to evaluate a tire uniformity characteristic of a tire T finished as a final product, particularly a variation in a force in a radial direction (Radial Force Variation: RFV) of the tire T, a variation in a force in a lateral direction (Lateral Force Variation: LFV) of the tire T, and conicity (lateral force always generated in a certain direction independently of a travel (rotational) direction of the tire T) as a product inspection.

The tire testing machine 1 includes a base 14, a spindle shaft 3 that can forward rotate and backward rotate together with the tire T subject to the uniformity measurement while holding the tire T via a pair of upper and lower rims 4, a frame main unit 2 that is placed on the base 14, and supports the spindle shaft 3 for rotation, a spindle shaft rotation motor 5 that constructs a spindle shaft drive device that forward rotates and backward rotates the spindle shaft 3 and the tire T held thereby via the pair of rims 4, a drum (load drum) 8 that has a simulated road surface 8a, which is an outer peripheral surface that can be pressed against a tread surface of the tire T, a pressing mechanism 7 that is placed on the base 14, supports the drum 8 for rotation about a center axis of the simulated road surface 8a, and relatively moves the spindle shaft 3 and the drum 8 with each other so that a tread surface of the tire T mounted via the pair of rims 4 on the spindle shaft 3 can be pressed against the simulated road surface 8a of the drum 8, a uniformity measurement unit (not shown) that measures the uniformity of the tire T, a pneumatic circuit 11, and a control unit 12.

The pneumatic circuit 11 supplies compressed air generated in an air supply source (not shown) to an inside of the tire T, and discharges the compressed air from the inside of the tire T to the outside such as the atmosphere, thereby adjusting an pneumatic pressure in the tire T.

The frame main unit 2 forms a cylindrical shape, is arranged on the base 14 so that an axis thereof is oriented in an up/down direction, and holds the spindle shaft 3 so that the spindle shaft 3 upward protrudes from a top end of the frame main unit 2. Specifically, the spindle shaft 3 is attached to the frame main unit 2 via a bearing unit provided in the frame main unit 2 so as to rotate about the up/down axis. The spindle shaft rotation motor 5 is arranged in a neighborhood of the spindle shaft 3, and a timing belt 6 is hung between an output shaft of the spindle shaft rotation motor 5 and the spindle shaft 3. The timing belt 6 transmits a driving force generated by the spindle shaft rotation motor 5 to the spindle shaft 3, thereby rotating the spindle shaft 3.

The pair of rims 4 is provided on a portion protruding upward from the top end of the frame main unit 2 out of the spindle shaft 3, and the spindle shaft 3 supports the tire T via the pair of rims 4. The drum 8 and the pressing mechanism 7 are disposed so as to be laterally positioned with respect to the tire T held via the pair of rims 4 by the spindle shaft 3, and the tread surface of the tire T can be brought in contact with the simulated road surface 8a of the drum 8.

The pressing mechanism 7 includes a drum holding unit 15 that holds the drum 8 for rotation about an axis in the upward/downward direction, and is supported by the base 14 so as to be able to slide in a horizontal direction in parallel with the radial direction of the tire T, a screw jack 9 that is fixed to the base 14, and moves the drum holding unit 15 and the drum 8 held thereby in the horizontal direction, and a drum transport motor 10 that drives the screw jack 9. The pressing mechanism 7 can move the drum 8 in the horizontal direction, in other words, can move the drum 8 relatively with respect to the spindle shaft 3 holding the tire T, thereby pressing the simulated road surface 8a of the drum 8 against the tread surface of the tire T.

The drum transport motor 10 and the spindle shaft rotation motor 5 are respectively constructed by servomotors. The control unit 12 can carry out control of an inter-shaft distance between the rotation shaft of the drum 8 and the spindle shaft 3 (namely a rotational center shaft of the tire T), namely a relative position control of the spindle shaft 3 and the drum 8 in accordance with reception/transmission of signals between the control unit 12 and the drum transport motor 10, and control of the rotation of the spindle shaft 3 holding the tire T for rotation, namely rotational drive control in accordance with reception/transmission of signals between the control unit 12 and the spindle shaft rotation motor 5.

The control unit 12 controls the operation of the spindle shaft rotation motor 5 so as to forward rotate the tire T, to decelerate the forward rotation, to immediately bring the rotational speed of the tire T to 0, and to further backward rotate the tire T. Moreover, the control unit 12 controls the operation of the pressing mechanism 7 so as to separate the drum 8 from the tire T when the rotation of the tire T is caused to transition from the forward rotation to the backward rotation, and forward move the drum 8, thereby applying the load to the tire T after the rotation of the tire T transitions to the backward rotation.

A description is now given of a sequence of the measurement of the tire uniformity by using the tire testing machine 1.

First, the uniformity during the forward rotation is measured. For this measurement, the pair of rims 4 separated into upper and lower rims sandwiches the tire T that has been transported from an upstream of an inspection line. As a result, the spindle shaft 3 can hold the tire T via the pair of rims 4. The pneumatic circuit 11 inflates the held tire T in a short period, and further adjusts the internal pressure of the tire T to a test pressure.

The control unit 12 operates the spindle shaft rotation motor 5 so as to forward rotate the tire T having the internal pressure adjusted to the test pressure described before, and operates the pressing mechanism 7 so as to press the drum 8 against the tire T, thereby "forward rotating" the drum 8. The uniformity measurement unit includes a load detector (load cell) for measuring a force generated on the drum 8 on this occasion. The uniformity (RFV and LFV) of the tire T forward rotating is measured by this measurement. After the uniformity measurement for the forward rotation is finished, the control unit 12 operates the pressing mechanism 7 so as to separate the drum 8 from the tire T, controls the operation of the spindle shaft rotation motor 5 so as to "backward rotate" the tire T, and controls the operation of the pressing mechanism 7 so as to press the simulated road surface 8a of the drum 8 against the tire T backward rotating in this way. The load detector (load cell) measures the force generated on the drum 8 on this occasion, thereby enabling the measurement of the uniformity (RFV and LFV) of the tire T during the backward rotation. The conicity and the like are measured based on the measurement results of the forward rotation and the backward rotation acquired in this way.

The tire testing machine 1 has a characteristic of carrying out "synchronization between the switching operation of the rotational direction of the spindle shaft 3 and the separation operation of the drum 8" in addition to the configuration described above. This characteristic enables the highly precise acquisition of the tire uniformity, particularly the variation in the force in the lateral direction (LFV) and the conicity of the tire immediately after the tire forward rotation is switched to the backward rotation. A description is now given of this characteristic, namely the method of bringing the rotational speed of the tire T (spindle shaft 3) to 0 (zero) in the state where the tread surface of the tire T and the simulated road surface 8a of the drum 8 are in the non-contact state when the uniformity during the backward rotation is measured, namely a synchronization method for a tire reload, based on drawings.

Specifically, the control unit 12 synchronizes the timing at which the rotational speed of the spindle shaft 3 becomes 0 (zero) (timing at which the rotation momentarily stops) and the timing at which the tread surface of the tire T is separated from the simulated road surface 8a of the drum 8 (timing at which the non-contact state is brought about) when the rotational direction of the tire T is changed from the forward rotation to the backward rotation. Specifically, the operations of the spindle shaft rotation motor 5 and the pressing mechanism 7 are controlled so that the drum 8 is gradually backward moved from the tread surface from the state where the tread surface of the tire T and the simulated road surface 8a of the drum 8 are in contact with each other, the rotation of the spindle shaft 3 is accordingly decelerated, and the rotational speed of the spindle shaft 3 is brought to 0 (zero) when the tread surface of the tire T and the simulated road surface 8a of the drum 8 are completely separated from each other, and are thus in the non-contact state. In other words, the control unit 12 synchronizes the relative movement between the spindle shaft 3 and the drum 8 and the rotation of the spindle shaft 3 with each other so that the rotational speed of the spindle shaft 3 is 0 (zero) in the state where the load is not applied to the drum 8 (in the state where a load of zero is applied).

A detailed description is now given of a method of carrying out the synchronization so as to stop the rotation of the spindle shaft 3 in the state where the load is not applied to the drum 8, namely a synchronization method for the drum reload based on drawings.

Figure 3:
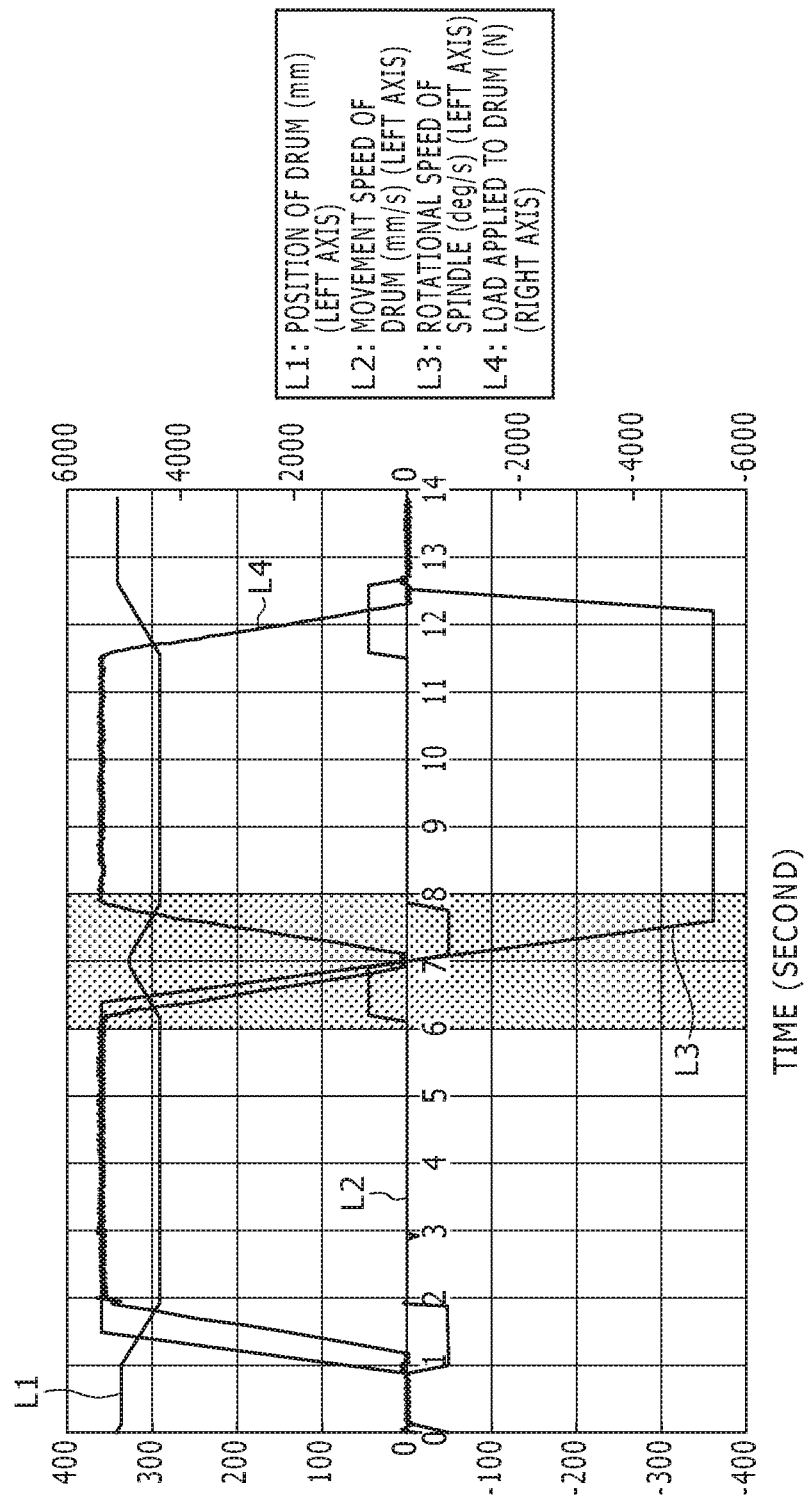
FIG. 3 is a chart of an operation pattern of a spindle shaft and a drum included in the tire uniformity testing machine.

Before the description of the synchronization method for the drum reload, a description is given of a uniformity measurement process during the forward rotation and the backward rotation referring to FIG. 3.

FIG. 3 is a diagram showing operation patterns of the spindle shaft 3 and the drum 8. A solid line L1 represents a position (mm) of the drum 8, a solid line L2 represents a movement speed (mm/s) of the drum 8, a solid line L3 represents a rotational speed (deg/s) of the spindle shaft 3, and a solid line L4 represents a load (N) applied to the drum 8 in FIG. 3.

The control unit 12 moves the drum 8 toward a direction approaching the spindle shaft 3, in other words, forward moves the drum 8 in the state where the tire T is held by the spindle shaft 3 via the rims 4, thereby bringing the simulated road surface 8a of the drum 8 in contact with the tread surface of the tire T (0 to 2 seconds in FIG. 3). On this occasion, a forward movement speed of the drum 8 is −50 mm/s as represented by the solid line L2. The drum 8 approaches the spindle shaft 3 so that the distance between axial centers of the simulated road surface 8a of the drum 8 and the spindle shaft 3 decreases from approximately 330 mm to approximately 295 mm at this movement speed as represented by the solid line L1. On the other hand, the spindle shaft 3 is forward rotating at a speed of approximately 360 deg/s as represented by the solid line L3. The drum 8 approaches the spindle shaft 3, the simulated road surface 8a of the drum 8 is pressed against the tread surface of the tire T in this way, and consequently, a load of approximately 5000 N is applied to the drum 8 as represented by the solid line L4.

The uniformity measurement for the tire T during the forward rotation is carried out in the state where the simulated road surface 8a of the drum 8 is in contact with the tread surface of the tire T in this way (from 2 to 6 seconds in FIG. 3). On this occasion, the drum 8 remains at a position where the forward movement is completed, and the movement speed of the drum 8 is thus 0 mm/s as represented by the solid line L2. The distance between the axial centers of the simulated road surface 8a of the drum 8 and the spindle shaft 3 is approximately 295 mm, the rotational speed of the forward rotation of the spindle shaft 3 is approximately 360 deg/s, and the load acting on the drum 8 is approximately 5000 N during the measurement as described before.

Then, the control unit 12 moves the drum 8 in a direction separating from the spindle shaft 3, in other words, backward moves the drum 8 in order to carry out the uniformity measurement during the backward rotation, thereby separating the simulated road surface 8a of the drum 8 from the tread surface of the tire T (from 6 to 7 seconds in FIG. 3).

On this occasion, a speed of the backward movement of the drum 8 is 50 mm/s as represented by the solid line L2. The distance between the axial centers of the simulated road surface 8a of the drum 8 and the spindle shaft 3 increases from approximately 295 mm to approximately 330 mm as represented by the solid line L1, while the rotation of the spindle shaft 3 decelerates from the speed of approximately 360 deg/s, and the rotation momentarily stops at a time point when approximately seven seconds has elapsed since the start of the deceleration as represented by the solid line L3. On this occasion, the drum 8 is separated from the tire T held by the spindle shaft 3, and the load is not applied to the drum 8 as represented by the solid line L4.

Then, the control unit 12 moves the drum 8 in a direction approaching the spindle shaft 3, in other words, forward moves the drum 8 in order to carry out the uniformity measurement during the backward rotation, thereby bringing the simulated road surface 8a of the drum 8 in contact with the tread surface of the tire T (from 7 to 8 seconds in FIG. 3). The speed of the forward movement of the drum 8 is −50 mm/s on this occasion as represented by the solid line L2, and the distance between the axial centers of the simulated road surface 8a of the drum 8 and the spindle shaft 3 decreases from approximately 330 mm to approximately 295 mm as represented by the solid line L1. On the other hand, the spindle shaft 3 is driven for rotation (solid line c in FIG. 3) so as to backward rotate at a speed of approximately 360 deg/s after the rotational speed momentarily becomes 0 (zero) from the forward rotation as represented by the solid line L3. On this occasion, the drum 8 approaches the spindle shaft 3, the simulated road surface 8a of the drum 8 is pressed against the tread surface of the tire T in this way, and the load of approximately 5000 N is thus applied to the drum 8 as represented by the solid line L4.

The uniformity measurement for the tire T during the backward rotation is carried out in the state where the simulated road surface 8a of the drum 8 is in contact with the tread surface of the tire T in this way (from 8 to 11.5 seconds in FIG. 3). On this occasion, the drum 8 remains at a position where the forward movement is completed, and the movement speed of the drum 8 is thus 0 mm/s as represented by the solid line L2. Moreover, the distance between the axial centers of the simulated road surface 8a of the drum 8 and the spindle shaft 3 is approximately 295 mm, the rotational speed of the backward rotation of the spindle shaft 3 is approximately −360 deg/s, and the load acting on the drum 8 is approximately 5000 N during the measurement as described before.

Figure 4:
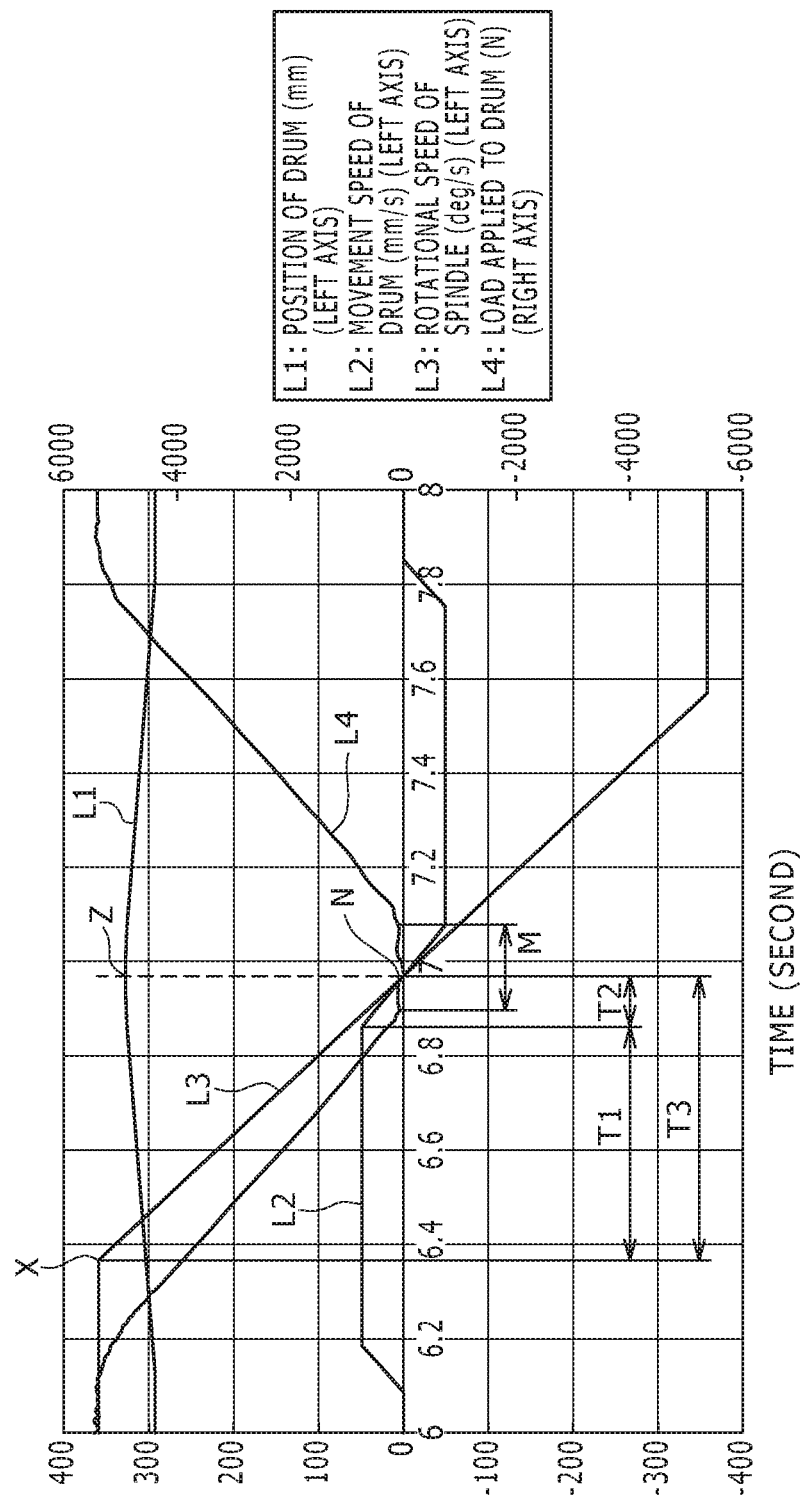
FIG. 4 is an enlarged view of a center portion of FIG. 3, and is a chart of an operation pattern of the spindle shaft and the drum when the tire during uniformity measurement is switched from a forward rotation to a backward rotation.

A detailed description is now given of the synchronization method for tire reload with reference to FIG. 4.

FIG. 4 is an enlarged view of a center portion, namely a gray scale portion of FIG. 3, and is a chart of an operation pattern of the spindle shaft 3 and the drum 8 when the tire T during the uniformity measurement is switched from the forward rotation to the backward rotation. The solid line L1 in FIG. 4 represents the position (mm) of the drum 8, the solid line L2 represents the movement speed (mm/s) of the drum 8, the solid line L3 represents the rotational speed (deg/s) of the spindle shaft 3, and the solid line L4 represents the load (N) applied to the drum 8 as in FIG. 3.

Referring to FIG. 4, the spindle shaft 3 starts deceleration (point X of the solid line L3) when the drum 8 backward moves to a predetermined position as represented by the solid line L1. On this occasion, the drum 8 backward moves at a constant speed as represented by the solid line L2. The backward movement of the drum 8 decelerates at a time point (point Y of the solid line L2) further backward displaced with respect to the predetermined position. This movement of the drum 8 momentarily stops at the position at which the tread surface of the tire T and the simulated road surface 8a of the drum 8 are brought into the non-contact state, specifically the reload position corresponding to a point Z as shown by the solid line L1. On the other hand, the load applied to the drum 8 decreases as the drum 8 backward moves at a constant speed as the solid line L4 shows.

On this occasion, in order to synchronize the tire reload with the backward rotation of the spindle shaft 3, the time point at which the spindle shaft 3 is started to decelerate is set so that the solid line L3 representing the rotational speed of the spindle shaft 3 passes through a time point (time point of the point Z) at which the drum 8 momentarily stops after the backward movement, namely a point N at which the load applied to the drum 8 represented by the solid line L4 becomes 0 (zero) (intersection between a vertical line (broken line) passing through the point Z and the solid line L4), in other words, the point N and the point on the solid line L3 at which the rotational speed becomes 0 match each other in FIG. 4. In other words, the synchronization of the tire reload is achieved by carrying out rotational drive control of the spindle shaft 3 so that the rotation of the spindle shaft 3 stops in a range (range M shown in FIG. 4) where the load applied to the drum 8 is substantially 0 (zero), in other words, the solid line L3 and the solid line L4 intersect with each other in the range M.

A description is now given of a method of calculating the spindle shaft deceleration start drum position, which is the position of the drum 8 at the time point (point X) at which the deceleration of the spindle shaft 3 required for the synchronization of the drum reload needs to be started.

(i) A spindle shaft deceleration required period T3 (FIG. 4) from a time point X at which the spindle shaft 3 starts the deceleration to a stop time point N is obtained. The spindle shaft deceleration required period T3 is given by Equation (1).

Spindle shaft deceleration required period $T3$
(s)=Rotational speed (deg/s) of spindle shaft 3
at start of deceleration/Deceleration (deg/s$^2$) of
spindle shaft 3 (1)

(ii) A drum deceleration required period T2 from a time point Y at which the deceleration of the movement of the drum 8 starts to a stop of this movement is obtained. The drum deceleration required period T2 is given by Equation (2).

Drum deceleration required period $T2$ (s)=Movement
speed of drum 8 at start of deceleration (mm/s)/
Deceleration (mm/s$^2$) of drum 8 (2)

(iii) A drum constant speed backward movement period T1, which is a period in which the drum 8 backward moves at the constant speed after the spindle shaft 3 starts the deceleration, is obtained. The drum constant speed backward movement period T1 is given by Equation (3).

The drum constant speed backward movement
period $T1$ (s)=Spindle shaft deceleration
required period $T3$ (s)−Drum deceleration
required period $T2$ (s) (3)

(iv) A drum constant speed movement distance δ1, which is a distance over which the drum 8 moves in the drum constant speed backward movement period T1, is obtained. The drum constant speed movement distance δ1 is given by Equation (4).

Drum constant speed movement distance δ1 (mm)
=Movement speed of drum 8 (mm/s)×Drum constant speed backward movement period *T*1 (s)  (4)

(v) A drum deceleration movement distance δ2, which is a distance over which the drum 8 moves in the drum deceleration required period T2, is obtained. The drum deceleration movement distance δ2 is given by Equation (5).

Drum deceleration movement distance δ2 (mm)
=Movement speed of drum 8 before deceleration start (mm/s)×Drum deceleration required period *T*2 (s)/2  (5)

(vi) A spindle shaft deceleration drum distance δ3, which is a distance between the position of the drum 8 at the time point X at which the spindle shaft 3 needs to start the deceleration and the reload position, is calculated. The spindle shaft deceleration drum distance δ3 is given by Equation (6).

Spindle shaft deceleration drum distance δ3 (mm)
=Drum constant speed movement distance δ1 (mm)+Drum deceleration movement distance δ2 (mm)  (6)

(vii) A position of the drum 8 at the time point X at which the spindle shaft 3 needs to decelerate, namely, the spindle shaft deceleration start drum position, is calculated. The spindle shaft deceleration start drum position is given by Equation (7).

Spindle shaft deceleration start drum position (mm)
=Reload position of drum 8 (mm)−Spindle shaft deceleration drum distance δ3 (mm)  (7)

The spindle shaft deceleration start drum position, namely the position of the drum 8 corresponding to the time point (X point) at which the deceleration of the spindle shaft 3 needs to be started can accurately be calculated through the calculation sequence.

As described before, with the tire uniformity testing machine 1 and the tire uniformity measurement method according to the present invention, the timing at which the simulated road surface 8*a* of the drum 8 is most separated from the tread surface of the tire T and the timing at which the rotation of the spindle shaft 3 (tire T) becomes 0 can be synchronized by the combination of control of the movement position of the drum 8 (control of the relative position of the drum 8 with respect to the spindle shaft) and control of the rotational speed of the spindle shaft 3 when the tire uniformity measurement during the backward rotation is carried out. This can minimize a difference between a rotational kinetic energy remaining in the drum 8 continuing the rotation by the inertia when the tire T and the simulated road surface 8*a* of the drum 8 are brought into the non-contact state and a rotational kinetic energy held by the drum 8 after the tire T again comes in contact with the drum 8, and can also minimize a rotational kinetic energy received by the tire T from the drum 8 when the tire T and the drum 8 again come in contact with each other. Further, a "displacement" between the tire T and the rims 4 when the tire T and the drum 8 again come in contact with each other can be minimized, and, as a result, measurement precisions of the LFV and the conicity can be increased.

It should be understood that the disclosed embodiment is an example in terms of all the points, and are not limitative.

For example, the timing at which the outer peripheral surface (simulated road surface 8*a* according to this embodiment) of the drum is most separated from the tread surface of the tire and the timing at which the rotation of the spindle shaft becomes 0 do not need to completely match with each other. Inconvenience caused by the inversion of the rotational direction of the spindle shaft in the state where the outer peripheral surface of the drum and the tread surface of the tire are in contact with each other can be avoided by synchronizing the change in the rotational speed of the spindle shaft and the relative position of the drum with respect to the spindle shaft to such a degree that the rotational speed of the spindle shaft becomes 0 at least in the state where the outer peripheral surface of the drum and the tread surface of the tire are in the non-contact state.

Moreover, in the embodiment disclosed herein, items which are not explicitly disclosed such as operation conditions, work conditions, various parameters, dimensions, weights, volumes, and the like of the components do not depart from extents which a person skilled in the art normally embodies, and employ values which a normal person skilled in the art easily envisages.

As described above, there are provided a tire uniformity testing machine and a tire uniformity measurement method capable of precisely acquiring the tire uniformity, particularly the variation in the force in the lateral direction (LFV) and the conicity of the tire immediately after the tire forward rotation is switched to the backward rotation in the tire uniformity measurement.

The provided tire uniformity testing machine is a tire uniformity testing machine, including a spindle shaft that is able to forward rotate and backward rotate together with a tire while holding the tire, a spindle shaft drive device that forward rotates and backward rotates the spindle shaft and the tire held thereby, a drum that has an outer peripheral surface that can be pressed against a tread surface of the tire, a pressing mechanism that supports the drum so as to rotate about a center axis of the outer peripheral surface, and moves the spindle shaft and the drum relatively to each other so as to be able to press the tread surface of the tire mounted on the spindle shaft against the outer peripheral surface of the drum, a uniformity measurement unit that measures uniformity of the tire during the forward rotation and the backward rotation based on a force generated on the drum while the tire is forward rotating and backward rotating, and a control unit that operates the spindle shaft drive device and the pressing mechanism so as to respectively control a rotational direction and a rotational speed of the spindle shaft and a relative position between the spindle shaft and the drum. The control unit controls rotational drive of the spindle shaft and the relative position between the spindle shaft and the drum such that when the rotational direction of the spindle shaft is inverted between the direction of the forward rotation and the direction of the backward rotation, the spindle shaft and the drum are relatively moved so as to be separated from each other, thereby causing the rotational speed of the spindle shaft to be 0 in a state where the outer peripheral surface of the drum and the tread surface of the tire are not in contact with each other.

Moreover, the provided tire uniformity measurement method includes preparing a tire uniformity testing machine including a spindle shaft that is able to forward rotate and backward rotate together with a tire while holding the tire, a spindle shaft drive device that forward rotates and backward rotates the spindle shaft and the tire held thereby, a drum that has an outer peripheral surface that can be pressed against a tread surface of the tire, and a pressing mechanism that supports the drum so as to rotate about a center axis of the outer peripheral surface, and moves the spindle shaft and the drum relatively to each other so as to be able to press the tread surface of the tire mounted on the spindle shaft against the outer peripheral surface of the drum, measuring uniformity of the tire during the forward rotation and the backward rotation based on a force generated on the drum while the tire is forward rotating and backward rotating, and operating the spindle shaft drive device and the pressing mechanism, and carrying out rotational drive control, which is control of a rotational direction and a rotational speed of the spindle shaft, and relative position control, which is control of a relative position between the spindle shaft and the drum, where the rotational drive control and the relative position control comprise relatively moving the spindle shaft and the drum to separate from each other when the rotational direction of the spindle shaft is inverted, thereby causing the rotational speed of the spindle shaft to be 0 in a state where the outer peripheral surface of the drum and the tread surface of the tire are not in contact with each other.

The method and the device can prevent a residual recess caused by the stop of the rotation of the tire in the state where a constant pressure is acting on the tire, namely the state where the load drum and the tire are in contact with each other from being generated by the combination of the rotational drive control of the spindle shaft and the control of the relative position between the spindle shaft and the drum, thereby preventing the precision of the measurement from decreasing resulting from the measurement of the uniformity in the state where the residual recess remains.

The method and the device are particularly effective for the increase in the precision of the measurement if the measurement of the uniformity includes measurement of, for example, at least one of the variation in the force in the radial direction of the tire and the variation in the force in the lateral direction of the tire, and the conicity.

Moreover, the rotational drive control and the relative position control preferably comprise synchronizing the timing at which the outer peripheral surface of the drum is most separated from the tread surface of the tire, and the timing at which the rotational speed of the spindle shaft is 0. The synchronization can more surely prevent the rotational speed of the spindle shaft from becoming 0 in a state where the outer peripheral surface of the drum and the tread surface of the tire are in contact with each other.

The invention claimed is:

1. A tire uniformity testing machine, comprising:
   a spindle shaft that is able to forward rotate and backward rotate together with a tire while holding the tire;
   a spindle shaft drive device that forward rotates and backward rotates the spindle shaft and the tire held thereby;
   a drum that has an outer peripheral surface contacts a tread surface of the tire during testing;
   a pressing mechanism that supports the drum so as to rotate about a center axis of the outer peripheral surface, and moves the spindle shaft and the drum relatively to each other so as to be able to press the tread surface of the tire mounted on the spindle shaft against the outer peripheral surface of the drum;
   a uniformity measurement unit that measures uniformity of the tire during the forward rotation and the backward rotation based on a force generated on the drum while the tire is forward rotating and backward rotating; and
   a control unit that operates the spindle shaft drive device and the pressing mechanism in conjunction with the uniformity measurement unit so as to respectively control a rotational direction and a rotational speed of the spindle shaft and a relative position between the spindle shaft and the drum,
   wherein the control unit controls rotational drive of the spindle shaft and the relative position between the spindle shaft and the drum such that when the rotational direction of the spindle shaft is inverted between the direction of the forward rotation and the direction of the backward rotation, the spindle shaft and the drum are relatively moved so as to separate from each other, thereby causing the rotational speed of the spindle shaft to be 0 in a state where the outer peripheral surface of the drum and the tread surface of the tire are not in contact with each other.

2. The tire uniformity testing machine according to claim 1, wherein the uniformity measurement unit measures at least one of a variation in a force in a radial direction of the tire, a variation in a force in a lateral direction of the tire, and conicity.

3. The tire uniformity testing machine according to claim 1, wherein the control unit synchronizes a timing at which the outer peripheral surface of the drum is most separated from the tread surface of the tire, and a timing at which the rotational speed of the spindle shaft is 0 with each other.

4. A method of testing uniformity of a tire, comprising:
   preparing a tire uniformity testing machine including a spindle shaft that is able to forward rotate and backward rotate together with a tire while holding the tire, a spindle shaft drive device that forward rotates and backward rotates the spindle shaft and the tire held thereby, a drum that has an outer peripheral surface that contacts a tread surface of the tire during testing, and a pressing mechanism that supports the drum so as to rotate about a center axis of the outer peripheral surface, and moves the spindle shaft and the drum relatively to each other so as to be able to press the tread surface of the tire mounted on the spindle shaft against the outer peripheral surface of the drum;
   measuring uniformity of the tire during the forward rotation and the backward rotation based on a force generated on the drum while the tire is forward rotating and backward rotating; and
   operating the spindle shaft drive device and the pressing mechanism, and carrying out rotational drive control, which is control of a rotational direction and a rotational speed of the spindle shaft, and relative position control, which is control of a relative position between the spindle shaft and the drum,
   wherein the rotational drive control and the relative position control comprise relatively moving the spindle shaft and the drum to separate from each other when the rotational direction of the spindle shaft is inverted, thereby causing the rotational speed of the spindle shaft to be 0 in a state where the outer peripheral surface of the drum and the tread surface of the tire are not in contact with each other.

5. The tire uniformity measurement method according to claim 4, wherein the measurement of the uniformity includes measurement of at least one of a variation in a force in a radial direction of the tire, a variation in a force in a lateral direction of the tire, and conicity.

6. The tire uniformity measurement method according to claim 4, wherein the rotational drive control and the relative position control comprise synchronizing a timing at which the outer peripheral surface of the drum is most separated from the tread surface of the tire, and a timing at which the rotational speed of the spindle shaft is 0 with each other.

\* \* \* \* \*